United States Patent [19]
Goshima et al.

[11] Patent Number: 4,799,048
[45] Date of Patent: Jan. 17, 1989

[54] ACCUMULATOR

[75] Inventors: Takahiro Goshima, Kakamigahara; Yoshiyuki Hattori, Toyoake; Hiroji Kinbara, Okazaki; Hiromi Otsuki, Anjo; Yoshihisa Nomura; Nobuyasu Nakanishi, both of Toyota, all of Japan

[73] Assignees: Nippondenso Co., Ltd., Kariya; Jidosha Kabushiki Kaisha, Toyota, both of Japan

[21] Appl. No.: 60,959

[22] Filed: Jun. 10, 1987

Related U.S. Application Data

[63] Continuation of Ser. No. 781,472, Sep. 30, 1985, abandoned.

[30] Foreign Application Priority Data

Sep. 28, 1984 [JP] Japan ................. 59-204546
Oct. 19, 1984 [JP] Japan ................. 59-220670

[51] Int. Cl.$^4$ .................... G08B 21/00; F16K 37/00
[52] U.S. Cl. ................................. 340/626; 138/31; 303/115; 340/52 C; 340/686
[58] Field of Search ................ 92/101; 138/31; 200/82 E, 84 C; 340/52 B, 52 C, 626, 686; 303/115

[56] References Cited
U.S. PATENT DOCUMENTS

| | | | |
|---|---|---|---|
| 1,077,472 | 11/1913 | Hofmann | 92/101 X |
| 1,952,916 | 3/1934 | Etten | 138/31 |
| 2,612,419 | 9/1952 | Reynolds | 92/101 X |
| 3,248,879 | 5/1966 | Natho | 138/31 X |
| 3,893,486 | 7/1975 | Meyers | 138/31 |
| 3,896,280 | 7/1975 | Blake | 200/82 E X |
| 4,014,213 | 3/1977 | Parquet | 138/31 X |
| 4,207,563 | 6/1980 | Soupal | 138/31 |
| 4,243,856 | 1/1981 | Gratzmuller | 200/82 E X |
| 4,441,860 | 4/1984 | Tsujimoto | 200/84 C |
| 4,617,806 | 10/1986 | Sakai et al. | 200/84 C |

FOREIGN PATENT DOCUMENTS 50-137612 11/1975 Japan.
55-66203 11/1978 Japan.

Primary Examiner—Stephen Marcus
Attorney, Agent, or Firm—Cushman, Darby & Cushman

[57] ABSTRACT

An accumulator has a piston axially slidably disposed in a cylinder mounted in a casing, the cylinder and the piston jointly defining a reservoir communicating with an inlet/outlet port in the casing. A piston rod axially movably disposed in the casing has an end slidably fitted in the cylindrical hole of the piston. The piston rod is normally urged by a spring to force the piston into the reservoir. The accumulator also includes a switch mechanism for detecting the position of the piston in the cylinder. The switch mechanism may comprise a reed switch, a light-sensitive switch, a pressure-sensitive switch, or a pushbutton switch.

12 Claims, 9 Drawing Sheets

ACCUMULATOR

This is a continuation of application Ser. No. 781,472, filed Sept. 30, 1985, which was abandoned upon the filing hereof.

BACKGROUND OF THE INVENTION

The present invention relates to an accumulator adapted to be disposed in the fluid supply tube system of a hydraulically operated device for temporarily storing hydraulic pressure energy or absorbing hydraulic pressure pulsations or fluctuations.

Spring-loaded accumulators are widely used such as in automotive hydraulic braking systems for storing the hydraulic pressure and discharging the stored hydraulic energy when needed. The amount of the fluid pressure energy that can be stored in the spring-loaded accumulator depends partly on the resilient force of the coil spring incorporated in the accumulator.

The spring-loaded accumulator has a fluid reservoir defined by a bore and a piston held against a piston rod extending through the coil spring, the piston being movable in the bore under the bias of the spring. To allow the spring to be extended and compressed smoothly in the tubular casing of the accumulator, there is a clearance between the spring and the inner wall surface of the tubular casing. In operation, the piston rod tends to be tilted slightly by the spring which is movable through the clearance with respect to the tubular casing. Therefore, the piston pushed by the piston rod is subject to a bending moment, and, as a result, suffers a diametrically localized load tending to produce uneven wear on the piston ring disposed around the piston. The piston ring thus worn would fail to provide a sufficient sealing capability.

Examples of spring-loaded accumulators are disclosed in Japanese Laid-Open Utility Model Publications Nos. 50-137612 and 55-66203.

The tubular casing of the accumulator is generally made of aluminum for a smaller weight. Consequently, the inner wall surface of the tubular casing is highly susceptible to wear arising from frictional engagement with the spring as it extends and contracts. The worn inner wall surface of the tubular casing results in a larger clearance between itself and the spring, thus amplifying the aforesaid problem.

Some spring-loaded accumulators have a pressure switch actuatable in response to a hydraulic pressure or a stroke switch operable in response to a piston displacement for preventing a danger which would result from an increase in the stored fluid pressure beyond a prescribed level. Dangers will also be induced by a large pressure drop, however, if the fluid leaks through the worn piston ring or the piston seizes in the bore. In automobile braking systems, such a large pressure reduction or an accumulator failure is detrimental to the proper functioning of the brake. The conventional spring-loaded accumulators have had no provision for alarming such troubles of the accumulators.

SUMMARY OF THE INVENTION

According to the present invention, there is provided an accumulator including a piston axially slidably disposed in a cylinder mounted in a casing, the cylinder and the piston jointly defining a reservoir communicating with an inlet/outlet port in the casing, a piston rod axially movably disposed in the casing and having an end slidably fitted in the cylindrical hole of the piston, and a spring disposed around the piston rod for normally urging the piston rod to force the piston into the reservoir.

According to the present invention, there is also provided an accumulator including a piston axially slidably disposed in a cylinder mounted in a casing, the cylinder and the piston jointly defining a reservoir communicating with an inlet/outlet port in the casing, a piston rod axially movably disposed in the casing and coupled to the piston, a spring disposed around the piston rod for normally urging the piston rod to force the piston into the reservoir, and means for electrically detecting the position of the piston in the cylinder. The means may comprise a reed switch, a light-sensitive switch, a pressure-sensitive switch, or a pushbutton switch.

It is an object of the present invention to provide an accumulator which is highly reliable in operation.

Another object of the present invention is to provide an accumulator having a piston rod with a front end fitted in a piston for preventing the piston ring on the piston from being subject to localized wear arising from sliding engagement with a cylinder.

Still another object of the present invention is to provide an accumulator having a means for detecting the position of a piston in a cylinder to check the accumulator for malfunctioning.

BRIEF DESCRIPTION OF THE DRAWINGS

The present invention will be described in detail by way of illustrative example with reference to the accompanying drawings, in which.

DETAILED DESCRIPTION

Figure 1:
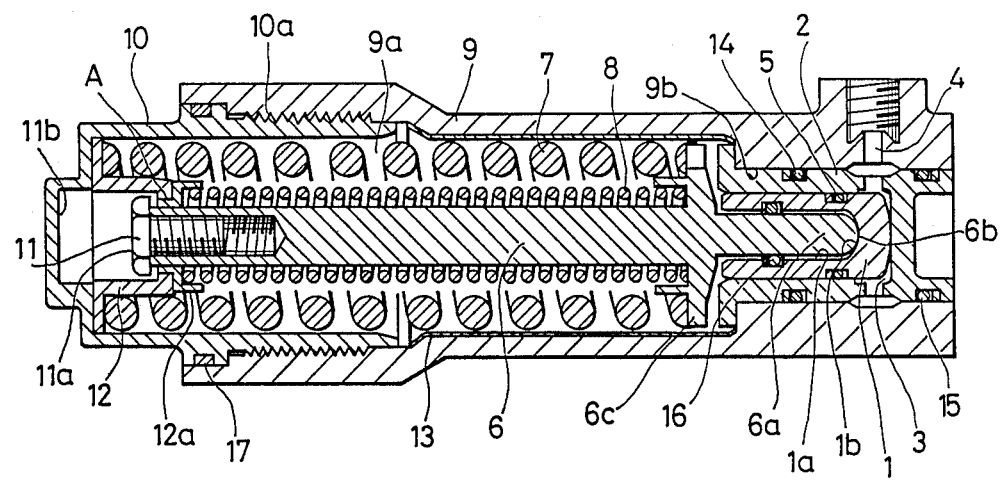
FIG. 1 is a longitudinal cross-sectional view of an accumulator according to an embodiment of the present invention.

Like or corresponding parts are denoted by like or corresponding reference characters throughout several views.

As shown in FIG. 1, an accumulator according to the present invention includes a cylindrical casing 9 having a larger-diameter bore in which a piston rod 6 having a front end 6a is axially movably disposed. A cylinder 2 is disposed in a smaller-diameter bore of the casing 9 at a front end thereof and defines a fluid reservoir 3 therein which communicates with an inlet/outlet port 4 defined in the casing 9. An axially imperforate piston 1 is axially slidably disposed in the cylinder 2 and has a coaxial cylindrical recess 1a opening into the larger-diameter bore 9a and having a bottom surface 1b. The front end 6a of the piston rod 6 has an outside diameter smaller than the inside diameter of the cylindrical recess 1a, the front end 6a being slidably fitted in the cylindrical recess 1a. The front end 6a has an end face 6b facing the bottom surface 1b of the cylindrical recess 1a.

There is a piston ring 5 disposed around the piston 1 and held slidably against the inner surface of the cylinder 2. Sealing rings 14, 15 are disposed around the cylinder 2 to provide a fluid seal between the cylinder 2 and the casing 9. A sealing ring 16 is interposed between the piston 1 and the front end 6a of the piston rod 6 for preventing grease from leaking from between the piston 1 and the front end 6a.

A hollow plug 10 has an externally threaded surface 10a threaded in a rear end portion of the casing 9. The hollow plug 10 has a central recessed bottom 11b. The piston rod 6 has a spring seat flange 6c adjacent to the front end 6a thereof. A holder 12 is held against the bottom of the plug 10 and supports thereon a bushing 12a having an annular portion A retained in the holder 12. The piston rod 6 has a rear end slidably extending through the annular portion A of the bushing 12a. The bushing 12a serves to prevent the piston rod 6 from being tilted with respect to the longitudinal axis of the accumulator, and also to position the second spring 8 to guard against contact with the rear end of the piston rod 6. The bushing 12a is made of phosphor bronze, for example, to prevent seizure during sliding movement thereof against the piston rod 6. A bolt 11 is threaded axially into the rear end of the piston rod 6, the bolt 11 having a bolt head 11a positioned in the holder 12. The piston rod 6, the springs 7, 8, the holder 12, and the bushing 12 can be preassembled together by the bolt 11. A first stronger compression coil spring 7 is disposed around the piston rod 6 under compression between the spring seat flange 6c and the bottom flange of the holder 12. A second weaker compression coil spring 8 is disposed around the piston rod 6 under compression between the spring seat flange 6c and the intermediate flange of the bushing 12a.

The piston rod 6 is therefore normally urged by the first and second springs 7, 8 to move the piston 1 to the right (FIG. 1) into the fluid reservoir 3. When the piston 1 is in the top dead center (TDC) shown in FIG. 1, substantially no fluid is stored in the reservoir 3. When the fluid is introduced under pressure into the reservoir 3 through the port 4, the piston 1 and hence the piston rod 6 are moved to the left. At the time the bolt head 11a engages the recessed bottom 11b of the plug 10, the piston 1 is in its bottom dead center (BDC). The volume of the fluid reservoir 3 is at a maximum when the bolt head 11a is held against the recessed bottom 11b of the plug 10. The volume of the fluid reservoir 3 can be adjusted by turning the bolt 11 in the piston rod 6 to change the axial position of the bolt head 11a with respect to the piston rod 6. A wear-resistant tubular lining layer 13 is fitted in the larger-diameter bore of the casing 9 and held against the inner surface thereof. A sealing ring 17 is interposed between the casing 9 and the plug 10.

Figure 2:
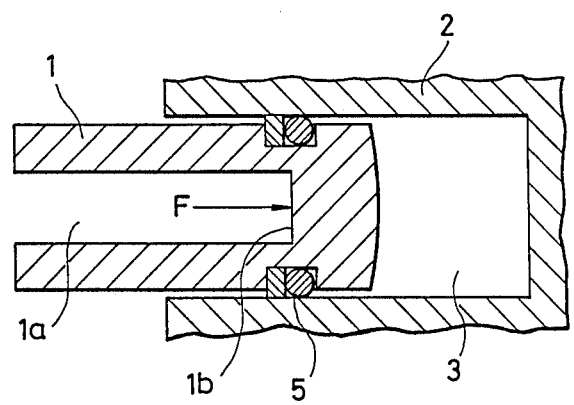
FIG. 2 is an enlarged cross-sectional view of a cylinder and a piston slidably fitted therein

As shown in FIGS. 1 and 2, the bottom surface 1b of the cylindrical recess 1a in the piston 1 lies in the plane in which the piston ring 5 is positioned. The front end 6a of the piston rod 6 is relatively loosely fitted in the cylindrical recess 1a with its end face 6b engaging the bottom surface 1b. Even when the piston rod 6 is tilted due to the clearance between the spring 7 and the casing 9 to exert the force F on the piston 1 in a direction inclined to its longitudinal axis, the piston 1 is not subject to any bending moment which is a component of the force F since the surface 1b to which the force F is applied is in the same plane, normal to the direction of the force F, as the point where the piston 1 is supported in the cylinder 2, i.e., the piston ring 5 is disposed on the piston 1. Therefore, the piston ring 5 is prevented from suffering localized wear. Even if the piston ring 5 is not in the same plane as the bottom surface 1b of the recess 1a in the piston 1, the bending moment imposed on the piston 1 can be held at a minimum insofar as the piston ring 5 and the bottom surface 1b are positioned closely to each other. In addition, any localized wear on the piston ring 5 is kept sufficiently small if the bottom surface 1b remains in the cylinder 2 when the piston 1 has reached its stroke end in its travel to the left (FIG. 2).

Figure 3:
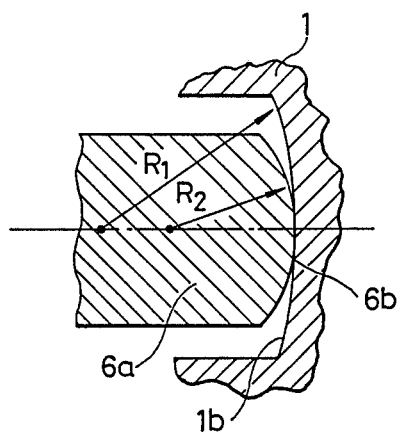
FIG. 3 is an enlarged fragmentary cross-sectional view of the piston and the front end of a piston rod inserted therein.

As illustrated in FIG. 3, the bottom surface 1b is a concave surface having a radius R1 of curvature which is slightly larger than the radius R2 of curvature of the end face 6b which is a convex surface. This surface configuration provides a mechanical strength large enough to bear a large load imposed by the springs 7, 8.

The casing 9 is normally made of aluminum or synthetic resin for a reduced overall weight. The tubular lining layer 13 fitted in the casing 9 prevents the inner surface of the casing 9 from being frictionally engaged and worn by the spring 7 which extends and contracts repeatedly under variations of the fluid pressure in the fluid reservoir 3. For this purpose, the tubular lining layer 13 is made of a material which is more resistant to wear than the material of the casing 9. The tubular lining layer 13 therefore keeps the clearance between the casing 9 and the spring 7 small thereby to prevent undesirable localized wear on the piston ring 5.

Figure 4:
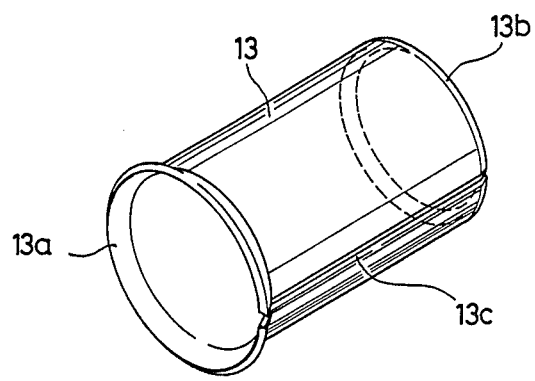
FIG. 4 is a perspective view of a lining member fitted in an outer casing of the accumulator shown in FIG. 1.

The tubular lining layer 13 may comprise a sheet of stainless steel which is shaped into a cylindrical form, as shown in FIG. 4. The lining layer 13 has a radially outward flange 13a on its rear end for allowing the spring 7 to extend and contract without interference with the rear end of the lining layer 13. The lining layer 13 also has a radially inward flange 13b on its front end and a slit 13c extending axially between the front and rear ends. The flange 13b and the slit 13c permits the lining layer 13 to be easily fitted into the casing 9. The lining layer 13 may be made of various engineering plastic materials of high rigidity and low frictional resistance, such as nylon, polyacetal, or Teflon (trademark). The lining layer 13 may alternatively be in the form of a synthetic resin layer of high wear resistance coated directly on the inner surface of the casing 9.

Figure 5:
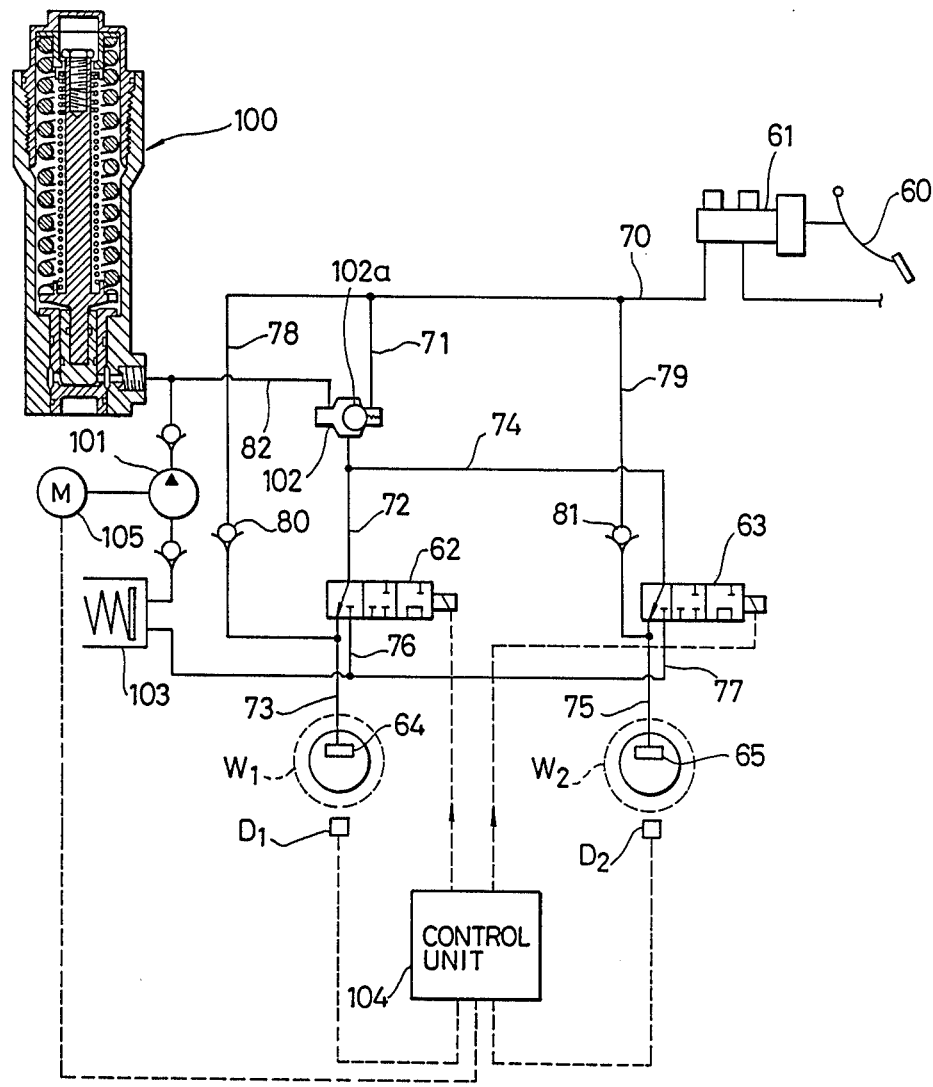
FIG. 5 is a schematic diagram of an automotive anti-skid brake system in which the accumulator of FIG. 1 is incorporated.

FIG. 5 shows an automotive anti-skid brake system incorporating the accumulator, generally denoted at 100, of the present invention.

The anti-skid brake system for automatically preventing automobile wheels from being locked when the wheels are abruptly braked, includes a brake pedal 60, a master cylinder 61 for producing a fluid pressure proportional to the depth to which the brake pedal 60 is depressed, and a pair of solenoid-operated directional control valves 62, 63 for controlling the fluid pressure to be supplied to respective wheel braking cylinders 64, 65 for first and second wheels W1, W2, respectively. The master cylinder 61 is connected to a supply passage 70 which is connected by supply passages 71, 72 to the valve 62. The supply passage 72 is connected through a supply passage 74 to the valve 63. The supply passage 70 is connected to the wheel braking cylinder 64 via a fluid passage 78 having a check valve 80. The supply passage 70 is also connected to the wheel braking cylinder 65 via a fluid passage 79 having a check valve 81. The valves 62, 63 are coupled through fluid passages 73, 75 respectively to the wheel braking cylinders 64, 65. The valves 62, 63 are coupled via fluid passages 76, 77, respectively, to a reservoir 103 connected to a fluid pressure pump 101 driven by a motor 105. The fluid pressure pump 101 is connected to the inlet/outlet port of the accumulator 100, which is also coupled via a fluid passage 82 to a fluid pressure control valve 102 connected between the supply passages 71, 72. The fluid pressure control valve 102 has a spring-biased ball 102a. The anti-skid brake system also includes a control unit 104 for energizing the solenoids of the valves 62, 63 in an anti-skid braking mode in response to signals produced by wheel speed sensors D1, D2 which detect the speeds of rotation of the wheels W1, W2, respectively. The fluid pressure control valve 102 serves to prevent a kickback to be imposed on the brake pedal 60 in the anti-skid braking mode.

Operation of the anti-skid brake system is as follows: When the brake pedal 60 is depressed to a depth which is in an appropriate range corresponding to the speed of travel of the automobile, the braking fluid is supplied from the master cylinder 61 through the passages 70, 71, 72, 74 and the valves 62, 63 to the wheel braking cylinders 64, 65. The wheels W1, W2 are now braked, but not locked.

If the brake pedal 60 is excessively depressed as when the driver finds an obstacle in front of the automobile, then the pressure of the supplied braking fluid is rapidly increased. As the wheels W1, W2 are about to be locked by the wheel braking cylinders 64, 65, the speed sensors D1, D2 apply signals to the control unit 104 for enabling the control unit 104 to generate signals to energize the solenoids of the valves 62, 63. As a result, the valves 62, 63 are shifted to disconnect the wheel braking cylinders 64, 65 from the master cylinder 61 and connect the wheel braking cylinders 62, 63 to the reservoir 103 through the passages 76, 77. Therefore, the fluid is delivered from the wheel braking cylinders 62, 63 via the passages 73, 75 and the valves 62, 63 to the reservoir 103. At the same time, the control unit 104 actuates the motor 105 of the fluid pump 101 to feed the fluid from the reservoir 103 into the accumulator 100. The fluid pressure in the wheel braking cylinders 64, 65 is now lowered to remove excessive braking forces on the wheels W1, W2 to prevent them from being locked.

The control unit 104 then detects an intermediate or moderate braking condition of the wheels W1, W2 through the detectors D1, D2, and energizes the valve solenoids to shift the valves 62, 63 to their neutral position. The passages 72, 73, 76 and the passages 74, 75, 77 are cut off to keep a constant fluid pressure in the wheel braking cylinders 64, 65.

As the braking of the wheels is weakened below a prescribed level, the control unit 104 responds to the signals from the speed sensors D1, D2 to actuate the valves 62, 63 to connect the passages 72, 73 and the passages 74, 75 again for thereby delivering the fluid pressure from the accumulator 100 to the wheel braking cylinders 64, 65. The braking forces on the wheels W1, W2 are increased again. The fluid pressure from the accumulator 100 shifts the ball 102a to the right in the valve 102 to disconnect the passage 82 from the passage 71. Therefore, the fluid pressure is prevented from acting on the brake pedal 60 as a kickback that would be felt by the driver's foot. If the wheels W1, W2 are about to be locked again, then the valves 62, 63 are shifted again by the control unit 104 to repeat the aforesaid alternate wheel braking and releasing cycles.

If the brake pedal 60 is released when the automobile speed is reduced to a desired speed, then the fluid pressure in the portions of the passages 78, 79 between the master cylinder 61 and the check valves 80, 81 are lowered to draw the braking fluid from the wheel braking cylinders 64, 65 via the check valves 80, 81, the passages 78, 79, and the passage 70 back to the master cylinder 61.

Figure 6:
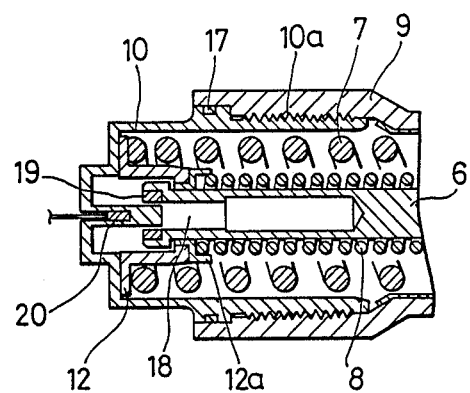
FIG. 6 is a fragmentary longitudinal cross-sectional view of an accumulator according to another embodiment of the present invention.
Figure 7:
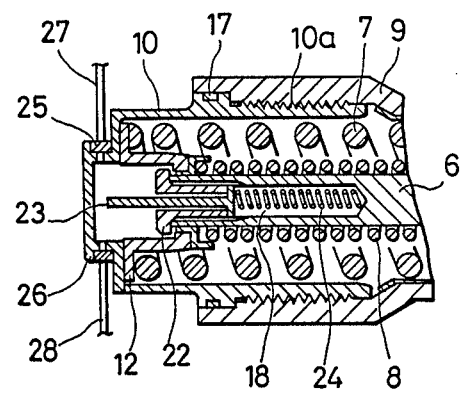
FIG. 7 is a fragmentary longitudinal cross-sectional view of an accumulator according to another embodiment of the present invention.

FIG. 6 fragmentarily shows an accumulator according to another embodiment of the present invention. The piston rod 6 has a cylindrical recess 18 defined axially in its rear end. A ring-shaped permanent magnet 19 is disposed in the rear open end of the piston rod 6. The plug 10 has a central rod 21 projecting toward the piston rod 6 through the ring-shaped permanent magnet 19. The central rod 21 supports a reed switch 20.

When there is no substantial fluid pressure in the reservoir of the accumulator, the piston rod 6 is positioned as shown in FIG. 6. As the fluid under pressure is supplied through the inlet/outlet port through the reservoir, the piston rod 6 is moved to the left to displace the ring-shaped permanent magnet 19 over the reed switch 20, wherupon the electric contacts of the reed switch 20 are connected to each other. The timing of energization of the reed switch 20, which depends n the position of the permanent magnet 19 or the volume of the reservoir, can freely be adjusted by selecting the shape, dimensions, magnetic forces, and position of the permanent magnet 19. The amount of fluid pressure energy that can be stored in the reservoir can be varied by turning the plug 10 to axially move the same with respect to the casing 9. When the reed switch 20 is turned on, the piston rod 6 is retracted against the forces of the springs 7, 8, and hence the proper functioning of the accumulator can be confirmed. As the piston rod 6 continues to be retracted, the permanent magnet 19 is further displaced beyond the reed switch 20 which is then turned off. The turning-off of the reed switch 20 upon continued movement of the piston rod 6 is therefore indicative of an excessive amount of fluid pressure stored in the reservoir. Accordingly, the reed switch 20 can serve as a device for warning such an excessive fluid pressure stored in the reservoir.

If the reed switch 20 is not turned on even when a fluid pressure large enough to displace the piston rod 6 against the resiliency of the springs 7, 8 is introduced in the reservoir, then the accumulator can be judged as malfunctioning due to, for example, a fluid leakage through the piston ring which is excessively worn, or seizure between the piston and the cylinder. Therefore, the reed switch 20 can also be used for detecting accumulator failures.

Figure 18:
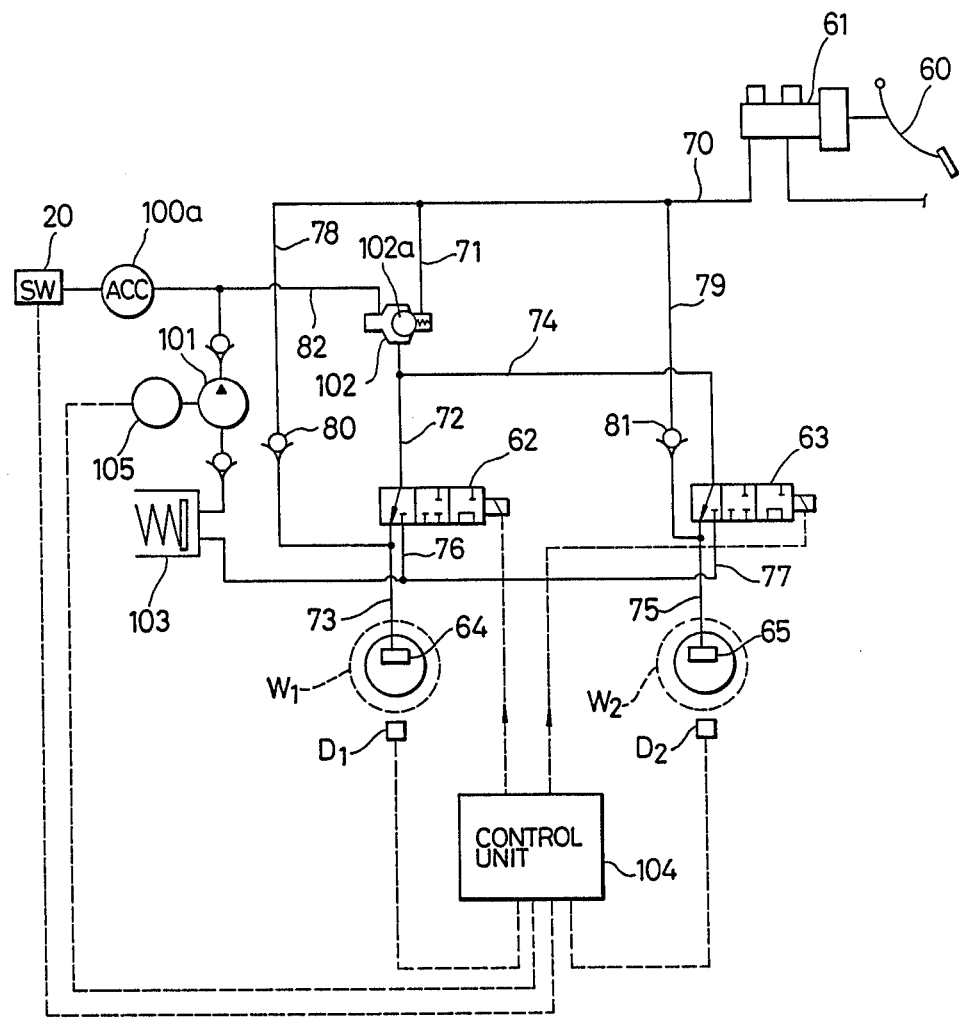
FIG. 18 is a schematic diagram of an automotive anti-skid brake system with the accumulator of FIG. 6 assemled therein.

FIG. 18 shows an anti-skid brake system for use in an automobile, with the accumulator, denoted at 100a, of FIG. 6 incorporated therein. The anti-skid brake system is essentially similar to that shown in FIG. 5 except that the reed switch 20 is electrically coupled to the control unit 104.

Figure 19:
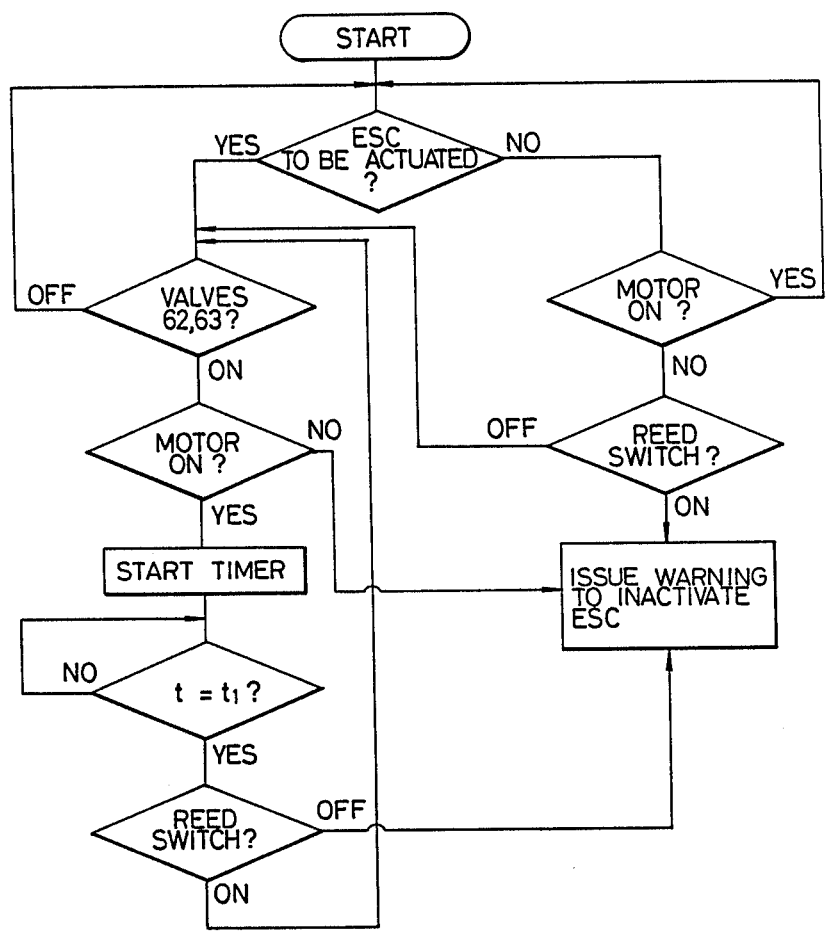
FIG. 19 is a flowchart of operation of the anti-skid brake system shown in FIG. 18.

Operation of the anti-skid brake system of FIG. 18 is the same as that of the anti-skid brake system of FIG. 5 as long as the accumulator functions properly. When the accumulator malfunctions, however, the anti-skid brake system will operate as follows: With reference to FIG. 19, when the anti-skid brake system (indicated as "ESC" in FIG. 19) is actuated if the piston of the accumulator 100a is stuck or is not properly sealed so that the piston remains fixed to prevent any fluid from being stored in the reservoir, the directional control valves 62, 63 are shifted (ON) to cut off the supply of the fluid from the master cylinder 61 and the motor 105 of the pump 101 is energized. At the same time, a timer (not shown) starts counting time (t). Upon elapse of a preset time t1, the signal from the reed switch 20 is checked. If the reed switch 20 is turned off at this time, then the piston is judged as failing to move and a warning to deactivate the ESC is issued. If the reed switch 20 is turned on, then the signal from the reed switch 20 is not checked until the valves 62, 63 are shifted again to cut off the fluid supply from the master cylinder 61. This is because there is a condition in which the fluid pressure may not be stored in the accumulator 100a even while the ESC is in operation, and such a condition should not be detected as a failure.

If the piston is retracted and then fails to return, then the motor 105 is de-energized to inactivate the ESC, followed by checking the signal from the reed switch 20. If the reed switch 20 remains turned on, the accumulator 100a is judged as failing to operate, and the warning is issued not to operate the ESC again. Therefore, the troubles of insufficient brake performance, locking of the wheels, and failure of the brake pedal to return can be prevented.

Figure 8:
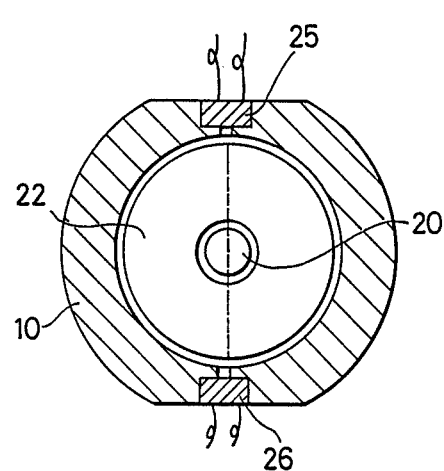
FIG. 8 is an enlarged transverse cross-sectional view of the accumulator shown in FIG. 7.

The following table shows different automobile conditions, anti-skid brake system conditions, and reed switch signal conditions, which depend on various accumulator failures:

rod 23 extends axially movably through the central axial hole in the bolt 22 and is normally urged to cause one end thereof to project from the bolt 22 under the resilincy of a spring 24 disposed in the cylindrical recess 18. The plug 10 supports thereon a light-sensitive switch composed of a light-emitting element 25 for emitting an infrared radiation and a lightdetector 26 spaced from the light-emitting element 25 for detecting the infrared radiation emitted from the light-emitting element 25. The light-emitting element 25 and the lightdetector 26 are mounted on the plug 10 in diametrically opposite relation as shown in FIG. 8. When the piston rod 6 is moved to the left as the fluid is introduced into the reservoir, the light-shielding rod 23 is moved into a position between the light-emitting element 25 and the lightdetector 26 to shield the infrared radiation emitted from the light-emitting element 25 toward the lightdetector 26. The light-emitting element 25 and the lightdetector 26 are connected by leads 27, 28, respectively, to a control circuit such as the control unit 104 shown in FIG. 18. Even after the rear end of the light-shielding rod 23 is engaged by the bottom of the plug 10, the piston rod 6 is allowed by the spring 24 to move back upon continued influx of the fluid into the reservoir. The timing of generation of an electric signal from the light-sensitive switch can be adjusted by turning the bolt 22 to vary the axial position of the rear end of the light-shielding rod 23 with respect to the piston rod 6.

Figure 9:
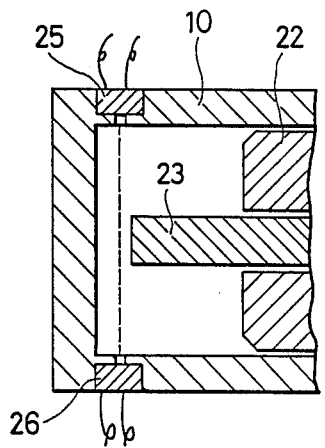
FIGS. 9 and 10 are fragmentary longitudinal cross-sectional views of the accumulator of FIG. 7, showing two different piston positions.
Figure 10:
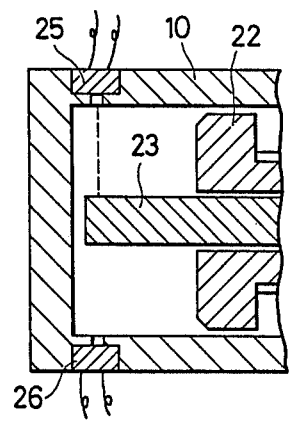

In FIG. 9, the infrared radiation emitted from the light-emitting element 25 is allowed to reach the lightdetector 26 since the rear end of the light-shielding rod 23 is not positioned between the light-emitting element 25 and the lightdetector 26. At this time, the light-sensitive switch is turned on. In FIG. 10, the infrared radiation from the light-emitting element 25 is blocked by the rear end of the light-shielding rod 23. Since the infrared radiation does not reach the lightdetector 26, the light-sensitive switch is turned off.

Figure 11:
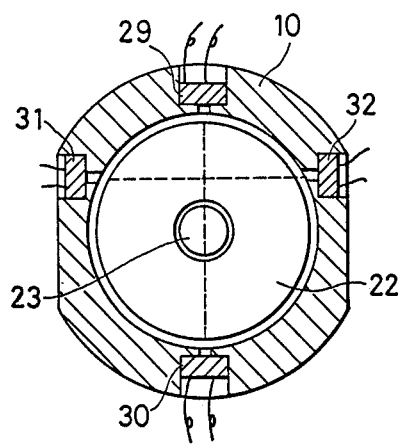
FIG. 11 is an enlarged transverse cross-sectional view of an accumulator according to still another embodiment.
Figure 12:
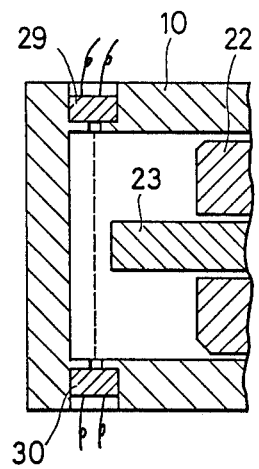
FIGS. 12 through 14 are fragmentary longitudinal cross-sectional views of the accumulator of FIG. 11, illustrating three different piston positions.

FIGS. 11 through 14 illustrate a light-sensitive switch arrangement according to a still further embodiment of the present invention. As shown in FIG. 11, the light-sensitive switch assembly is composed of a first light-sensitive switch comprising a light-emitting element 29 and a lightdetector 30 disposed on the plug 10 in diametrically opposite relation, and a second light-sensitive switch comprising a light-emitting element 31 and a lightdetector 32 disposed on the plug 10 which confront each other along a line off the light-shielding rod 23. The first and second light-sensitive switches are positioned in substantially the same plane normal to the axis of the plug 10. Therefore, the infrared radiation emitted

| Accumulator Failures | Automobile Conditions | System Conditions | | | | Reed switch Signal |
|---|---|---|---|---|---|---|
| | | ESC | Valves 62, 63 | Motor 105 | Time t(*) | |
| Piston 2 fixed at TDC | Wheels locked | On | Fluid supply cut off | On | t = t1 | Off |
| Piston 2 fixed at BDC | Wheels locked | Off | — | Off | — | On |
| Fluid leakage | Brake performance lowered | On | Fluid supply cut off | On | t = t1 | Off |

(*)t is the time elapsed after the motor 105 has started to operate.

Figure 13:
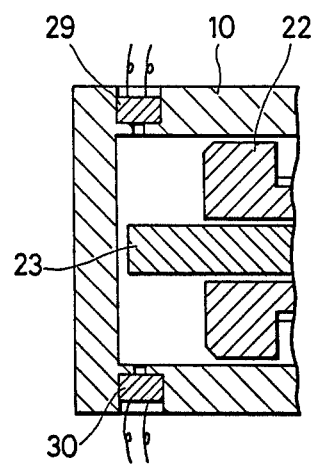
Figure 14:
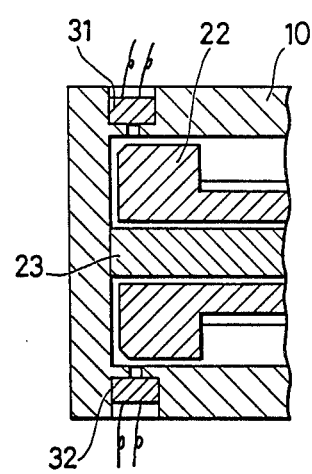

FIGS. 7 through 10 show an accumulator according to still another embodiment according to the present invention. A bolt 22 is threaded in the cylindrical recess 18 in the rear end of the piston rod 6. A light-shielding from the light-emitting element 29 can be cut off by the rear end of the light-shielding rod 23 as shown in FIG. 13. However, the infrared radiation emitted from the light-emitting element 31 cannot be cut off by the rear end of the light-shielding rod 23, but can be cut off by the head of the bolt 22 as shown in FIG. 14. As the fluid is introduced into the reservoir, the piston and hence the piston rod are retracted to move the light-shielding rod 23 from the position of FIG. 12 to the position of FIG. 13, whereupon the infrared radiation from the light-emitting element 29 is prevented from reaching the lightdetector 30. Therefore, the first light-sensitive switch is turned off to generate a first signal indicating that the volume of the reservoir has been increased to a first preset level. Upon further introduction of the fluid into the reservoir, the piston and the piston rod are continuously retracted to bring the rear end of the light-shielding rod 23 into engagement with the bottom of the plug 10 while the spring 24 (FIG. 7) is progressively compressed. When the piston is displaced to its bottom dead center, the bolt 22 is moved to the left (FIG. 14) over the light-shielding rod 23 until the bolt head cuts off the infrared radiation emitted from the light-emitting element 31. The second light-sensitive switch is now turned off to issue a second signal indicating that the volume of the reservoir has further increased to a second preset level.

Figure 15:
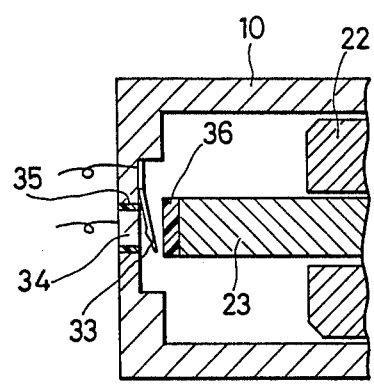
FIGS. 15 through 17 are fragmentary longitudinal cross-sectional views of accumulators constructed according to other embodiments of the invention.

FIG. 15 shows another switch assembly according still another embodiment in which the bottom of the plug 10 supports thereon a microswitch comprising a spring contact 33 and a fixed contact 34. The fixed contact 34 is surrounded by an electric insulating layer 35. The rod 23 is identical to the light-shielding rod 23 of FIGS. 7 through 14, but is not employed to shield light. The rear end of the rod 23 supports thereon an electric insulating body 36. When the rod 23 is retracted to the left (FIG. 15), the spring contact 33 is pushed by the electric insulating body 36 into contact with the fixed contact 34, whereupon the microswitch is turned on.

Figure 16:
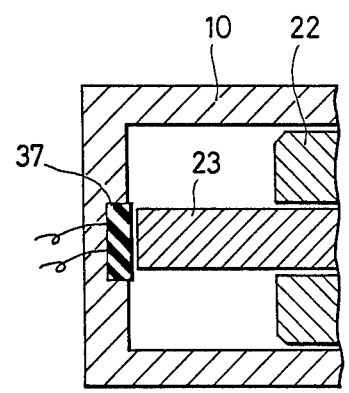

According to still another embodiment shown in FIG. 16, the plug 10 supports thereon a pressure-sensitive switch 37 comprising a body of conductive rubber positioned in confronting relation to the rod 23. When the piston is retracted by the fluid introduced into the reservoir, the rod 23 is pressed against the pressure-sensitive switch 37, the electric conductivity of the pressure-sensitive switch 37 is increased to generate a signal representing that the volume of the reservoir has exceeded a prescribed level.

Figure 17:
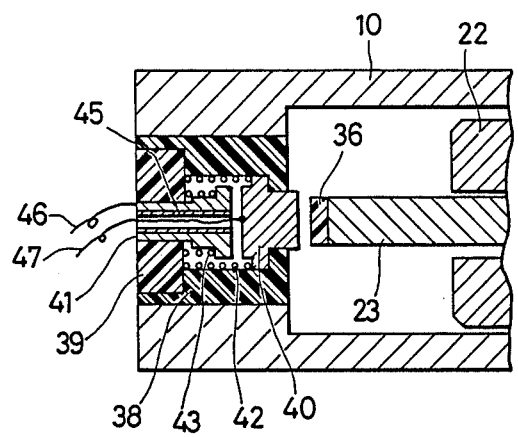

FIG. 17 illustrates a pushbutton switch assembled in the bottom of the plug 10. The plug 10 has a tubular body 38 and an annular body 39 which are made of an electrically insulating material and positioned in the bottom thereof. The pushbutton switch includes a first contact or electrode 40 axially movably disposed in the tubular body 38 and prevented from being displaced out of the tubular body 38, and a second contact or electrode 41 axially movably supported by the annular body 39 in the tubular body 38. The first electrode 40 is normally urged by a spring 42 to be spaced from the second electrode 41, which is resiliently supported by a spring 43. The first electrode 40 is connected to a lead 44 extending through a tube 45 disposed axially in the second electrode 41, and the second electrode 41 is connected to a lead 46. In operation, as the fluid is introduced into the accumulator reservoir, the rod 23 is retracted to cause its electric insulating body 36 to push the first electrode 40 until it is brought into contact with the second electrode 41 against the force of the spring 42. The pushbutton switch is now turned on. The spring 43 serves as a cushioning body to allow the second electrode 41 to be retracted upon being engaged by the first electrode 40. The spring 43 can also be used to adjust the distance between the first and second electrodes 40, 41.

Although certain preferred embodiments of the present invention have been shown and described in detail, it should be understood that various changes and modifications may be made therein without departing from the scope of the appended claims.

We claim:
1. An accumulator comprising:
a casing having an inlet/outlet port;
a cylinder disposed in said casing;
a piston slidably disposed in said cylinder, said cylinder and one end of said piston jointly defining a reservoir of variable volume communicating with said inlet/outlet port and said piston having a coaxial recess extending from the other end of said piston to a bottom therein;
a piston ring held on an outer surface of said piston and lying in substantially the same plane as the inner surface of said bottom;
a piston rod axially movably disposed in said casing and having an end slidably fitted in said recess; and
a spring engaged with said piston rod for normally urging said piston rod toward said bottom to keep said end of said piston rod and said piston ring positioned in substantially the same position at all times with respect to a longitudinal axis of said piston to force said piston to reduce the volume of said reservoir.

2. An accumulator according to claim 1, wherein the surface of said bottom is concave and said end of the piston rod has convex end surface urged against said concave bottom surface.

3. An accumulator according to claim 2, wherein aid concave bottom surface has a radius of curvature larger than the radius of curvature of said convex end surface of the end of the piston rod.

4. An accumulator according to claim 1, wherein the spring is a coil disposed around the piston rod and further including a cylindrical wear-resistant lining layer made of a material of high rigidity fitted in said casing and held against the inner surface of said casing and disposed around said spring.

5. An accumulator comprising;
a casing having an inlet/outlet port;
a cylinder disposed in said casing;
a piston axially slidably disposed in said cylinder, said cylinder and one end of said piston jointly defining a reservoir of variable volume communicating with said inlet/outlet port and said piston having a coaxial recess extending from the other end of said piston to a bottom therein;
a piston ring held on an outer surface of said piston, said piston ring and the inner surface of said bottom being located in substantially the same plane;
a piston rod axially movably disposed in said casing and having an end slidably fitted in said coaxial recess;
a spring engaged with said piston rod for normally urging said piston rod to keep said end of the piston rod and said piston ring positioned in substantially the same position at all times with respect to the longitudinal axis of said piston to force said piston into said reservoir; and means for electrically detecting the position of said piston in said cylinder.

6. An accumulator according to claim 5, including a plug connected to said casing remotely from said piston and supporting said spring, said detecting means comprising a reed switch mounted on said plug and a ring-shaped permanent magnet mounted n said piston rod and movable therewith to a position in which said switch is located within said magnet for actuating said switch when said piston reaches a prescribed position in said cylinder.

7. An accumulator according to claim 5, including a plug connected to said casing remotely from said piston and supporting said spring, said detecting means comprising a light-sensitive switch mounted on said plug and a rod mounted on said piston rod for actuating said light-sensitive switch.

8. An accumulator according to claim 7, wherein said light-sensitive switch comprises a light-emitting element and a lightdetector spaced therefrom, said rod mounted on said piston rod serving as a light-shielding rod movable into a position between said light-emitting element and said lightdetector.

9. An accumulator according to claim 8, including a bolt axially threaded into said piston rod, said means further including a second light-sensitive switch mounted on said plug and actuatable by said bolt.

10. An accumulator according to claim 9, wherein said second light-sensitive switch comprises a light-emitting element and a lightdetector spaced therefrom along a line off said light-shielding rod.

11. An accumulator according to claim 5, including a plug connected to said casing remotely from said piston and supporting said spring, said detecting means comprising a pressure-sensitive switch mounted on said plug and a rod mounted on said piston rod for actuating said pressure-sensitive switch.

12. An accumulator according to claim 5, including a plug connected to said casing remotely from said piston and supporting said spring, said detecting means comprising a pushbutton switch mounted on said plug and a rod mounted on said piston rod for actuating said pushbutton switch.

* * * * *

UNITED STATES PATENT AND TRADEMARK OFFICE
CERTIFICATE OF CORRECTION

PATENT NO. : 4,799,048

DATED : Jan. 17, 1989

INVENTOR(S) : GOSHIMA et al.

It is certified that error appears in the above-identified patent and that said Letters Patent is hereby corrected as shown below:

On the Title Page Assignee should read

-- [73] Assignees: Nippondenso Co., Ltd. Kariya;
Toyota Jidosha Kabushiki Kaisha, Toyota,
both of Japan --

Signed and Sealed this

Twenty-sixth Day of September, 1989

Attest:

DONALD J. QUIGG

*Attesting Officer*　　　　　*Commissioner of Patents and Trademarks*